United States Patent [19]

Chirico

[11] 4,180,547

[45] Dec. 25, 1979

[54] PROCESS FOR RECOVERY OF CHEMICALS FROM SALINE WATER

[75] Inventor: Anthony N. Chirico, Short Hills, N.J.

[73] Assignee: Ecodyne, Lincolnshire, Ill.

[21] Appl. No.: 854,811

[22] Filed: Nov. 25, 1977

[51] Int. Cl.² .............................................. C01D 3/06
[52] U.S. Cl. .................................. 423/197; 23/302 T;
423/199; 423/481
[58] Field of Search ............... 423/197, 199, 163, 481;
210/53; 23/302 T

[56] References Cited

U.S. PATENT DOCUMENTS

| 1,435,524 | 11/1922 | Huber | 423/199 |
| 1,922,283 | 8/1933 | Dering | 23/302 |
| 1,937,995 | 12/1933 | Thomsen | 423/197 |
| 3,163,599 | 12/1964 | Salutsky et al. | 423/197 |

OTHER PUBLICATIONS

"By-Products from Saline Water Conversion Plants—A Feasibility Study" by American Cyanamid Company, for Office of Saline Water, United States Department of the Interior, Research and Development Progress Report No. 110, Sep. 1974.
"A Feasibility Study of the Utilization of Waste Brines from Desalination Plants, Part I," J. J. Christensen et al, for the Office of Saline Water, United States Department of the Interior, Research and Development Report No. 245, Apr. 1967.

Primary Examiner—Delbert E. Gartz
Assistant Examiner—Wayne A. Langel

Attorney, Agent, or Firm—Hume, Clement, Brinks, Willian & Olds, Ltd.

[57] ABSTRACT

A continuous process for the recovery of chemicals in saline water including the steps of converting the sulfates in the saline water feed to sodium sulfate; separating and recovering in the oxide forms essentially all of the magnesium and calcium from the saline water feed; then preparing a sodium chloride fortified solution by mixing the feed with recycled sodium chloride; crystallizing and re-crystallizing and then separating sodium chloride crystals, preferably in two evaporative crystallization processes; stripping bromine from the sodium chloride depleted solution; crystallizing and then separating sodium chloride and sodium sulfate crystals from each other and then from solution; recycling the separated sodium chloride to the first sodium chloride crystallization step; separating residual sulfates from the solution; crystallizing and then separating sodium chloride crystals; recycling the separated sodium chloride to the first sodium chloride crystallization step; crystallizing and then separating potassium chloride from the solution; and recycling the resulting solution to the last sodium chloride crystallization step. Substantial quantities of potable water are produced by the process. In a preferred embodiment, sodium chloride is electrolytically converted to sodium hydroxide, chlorine and hydrogen. Part of the sodium hydroxide is used in the process, the remainder is concentrated and flaked. Part of the chlorine is liquified, the remainder is combined with a portion of the hydrogen to form hydrochloric acid. Finally, the steam boiler flue gas may be combined with sodium hydroxide to produce the sodium carbonate used in the process.

33 Claims, 4 Drawing Figures

PROCESS FOR RECOVERY OF CHEMICALS FROM SALINE WATER

BACKGROUND OF THE INVENTION

The invention relates to a process for the recovery of the principal mineral elements contained in saline waters, such as sea water, salt water concentrates and brines, together with most of the water, which is recovered as potable water.

Saline waters, particularly sea water, contain a wide variety of dissolved minerals and chemicals, the bulk of which are present in the form of ions. In sea water, for example, the major ion constituents are sodium, magnesium, calcium, potassium, chlorine, sulfate, bicarbonate, and bromine ions. For many years, processes have been developed and attempts have been made to recover the major mineral or chemical constituents from sea water and other saline waters. Extensive efforts have been made in this direction in the last ten to fifteen years due to the availability of large quantities of brine by-product solutions obtained from commercial sea water desalination plants. Heretofore, commercially viable processes have been limited to the recovery of only a few of these valuable constituents, have produced substantial, unusable wastes, and have fallen far short of extracting the majority of the water in the feed. Thus, there is a need for a practical and economic process for the recovery of a substantial percentage of the principal minerals and chemicals in saline water together with most of the water and for a recovery process which produces only relatively minor amounts of unusable wastes.

SUMMARY OF THE INVENTION

The invention relates to a continuous process which may be used to recover most of the sodium, magnesium, calcium, potassium, chlorine, bromine and sulfate present in saline water, particularly desalination plant by-product brine solutions. In addition, most of the water in the saline water feed may be recovered as potable water.

In the process, a saline water feed initially is chemically treated to remove essentially all, 99% or more, of the magnesium and calcium in the form of salable compounds, such as magnesium oxide (magnesia) and calcium oxide (lime), or as compounds which may be converted to salable compounds. Advantageously, the sulfate and chloride ions associated with the magnesium and the calcium are converted to sodium sulfate and sodium chloride for recovery at later stages of the process. The magnesium and calcium depleted solution then is combined with recycled sodium chloride to form a sodium chloride fortified solution. Essentially pure sodium chloride crystals are obtained from the sodium chloride fortified solution by crystallizing sodium chloride from the solution and then separating the sodium chloride crystals from the filtrate or mother liquor. Advantageously, two stages of crystallization and separation are employed, each of which comprises evaporative crystallization followed by centrifugation. The crystals recovered from the first stage are dissolved between stages, with water for dissolution advantageously being provided by the second stage evaporative crystallizer. The redissolved sodium chloride then is recrystallized in the second stage to commercial quality sodium chloride.

At this point, the mother liquor stream, which includes potassium chloride, sodium sulfate, sodium bromide and unrecovered sodium chloride, is acidified and treated with chlorine to convert bromine ions to molecular bromine. The bromine then is removed from the stream by stripping. Next the stream is neutralized and sodium sulfate and sodium chloride crystals are crystallized. The crystal containing slurry is separated into a sodium sulfate crystal rich slurry and a sodium chloride crystal rich slurry, preferably by an elutriation classification. Both slurries contain uncrystallized potassium chloride. The sodium sulfate and sodium chloride then are separated from their respective slurries. The recovered sodium sulfate may then be dried to salable salt cake (sodium sulfate). The recovered sodium chloride is recycled to fortify the initial magnesium and calcium depleted solution.

The mother liquors remaining from the sodium sulfate and sodium chloride rich slurries are combined, and the combined solution then is treated to precipitate residual sulfate ions remaining in the combined solution. Next, most of the remaining sodium chloride is removed from the solution by the crystallization and separation of sodium chloride crystals. These sodium chloride crystals are recycled to fortify the initial magnesium and calcium depleted solution. The mother liquor remaining from this last sodium chloride separation is vacuum crystallized to obtain potassium chloride crystals which are then separated from the crystallized solution and dried to salable potassium chloride. The solution from which the potassium chloride is separated may be recycled, preferably to the last sodium chloride crystallization step, since it still contains some sodium chloride and potassium chloride.

Significant quantities of potable water are obtained during various steps of the process, primarily as vapor condensate during the crystallization steps. As a result, virtually all of the water contained in the feed may be recovered as potable water.

The sodium chloride crystals obtained from the process may be dried and sold. Advantageously, a portion of the sodium chloride crystals are dissolved and then are electrolytically converted to an aqueous sodium hydroxide solution and to chlorine and hydrogen gases. Preferably, a portion of the sodium hydroxide solution is used in the process to remove magnesium from the saline water feed; the remainder is concentrated and flaked to salable flaked caustic. A portion of the chlorine gas is liquified; the remainder of the chlorine and part of the hydrogen are used to prepare hydrochloric acid. Preferably, part of the liquid chlorine and the hydrochloric acid are used in the process; the rest may be sold.

In a preferred embodiment of the invention, the flue gas from the boilers used to generate steam for the evaporators is reacted with sodium hydroxide to produce sodium carbonate. This chemical is then used in the calcium removal step. Preferably, all of the crystallization steps, except the vaccum crystallization, employ evaporative crystallizers which are combined into a large, integrated multiple effect evaporator system.

The principal advantages of the invention are the ability to economically recover as commercially salable compounds virtually all of the principal mineral and chemical constituents found in saline water and to simultaneously recover virtually all of the water in the feed as potable water. Heretofore, the simultaneous economical recovery of commercially salable sodium chloride, potassium chloride, sodium sulfate, calcium and magnesium compounds and sodium chloride derived products had not been achieved, particularly in combination with the recovery of significant quantities of potable water. Moreover, these extremely beneficial results may be achieved with only minimal waste production.

These beneficial results are achieved as a result of the synergistic processing sequence of the invention. This processing sequence removes hardness at the beginning and permits clean, unscaled operation during the remaining steps of the process. Moreover, hardness is most advantageously removed while the sulfate and chlorine ions associated with the calcium and magnesium are converted to recoverable sodium compounds. Since few of the steps employ an acidic environment, expensive, special alloy equipment is not necessary. The recycle of sodium chloride fortifies the feed solution to the first and largest crystallization steps, and thereby reduces the throughput volume, equipment size, and utility costs, while improving sodium chloride yield and purity. The dissolution of the initial, crude crystallization product with vapor condensate, insures purity and reduces the consumption of outside make-up water. The two stage sodium chloride crystallization sequence insures the production of a high quality sodium chloride product. All of the reactants added during the process may be obtained from the process. The processing sequence permits significantly greater quantities of sodium chloride to be produced per unit of saline feed than is possible with conventional processes, along with the production of a significantly smaller amount of unusable waste per unit of feed. The use of an integrated, multiple effect vapor system reduces steam consumption considerably. Moreover, the processing sequence effectively precludes the formation of large quantities of the complexes and sludges which, in most saline chemical recovery processes, tie up the valuable chemical constituents and significantly impair their recovery.

Additional features and advantages of the invention are described in and will appear from the description of the preferred embodiments and from the drawings.

DESCRIPTION OF THE PREFERRED EMBODIMENTS

Figure 1:
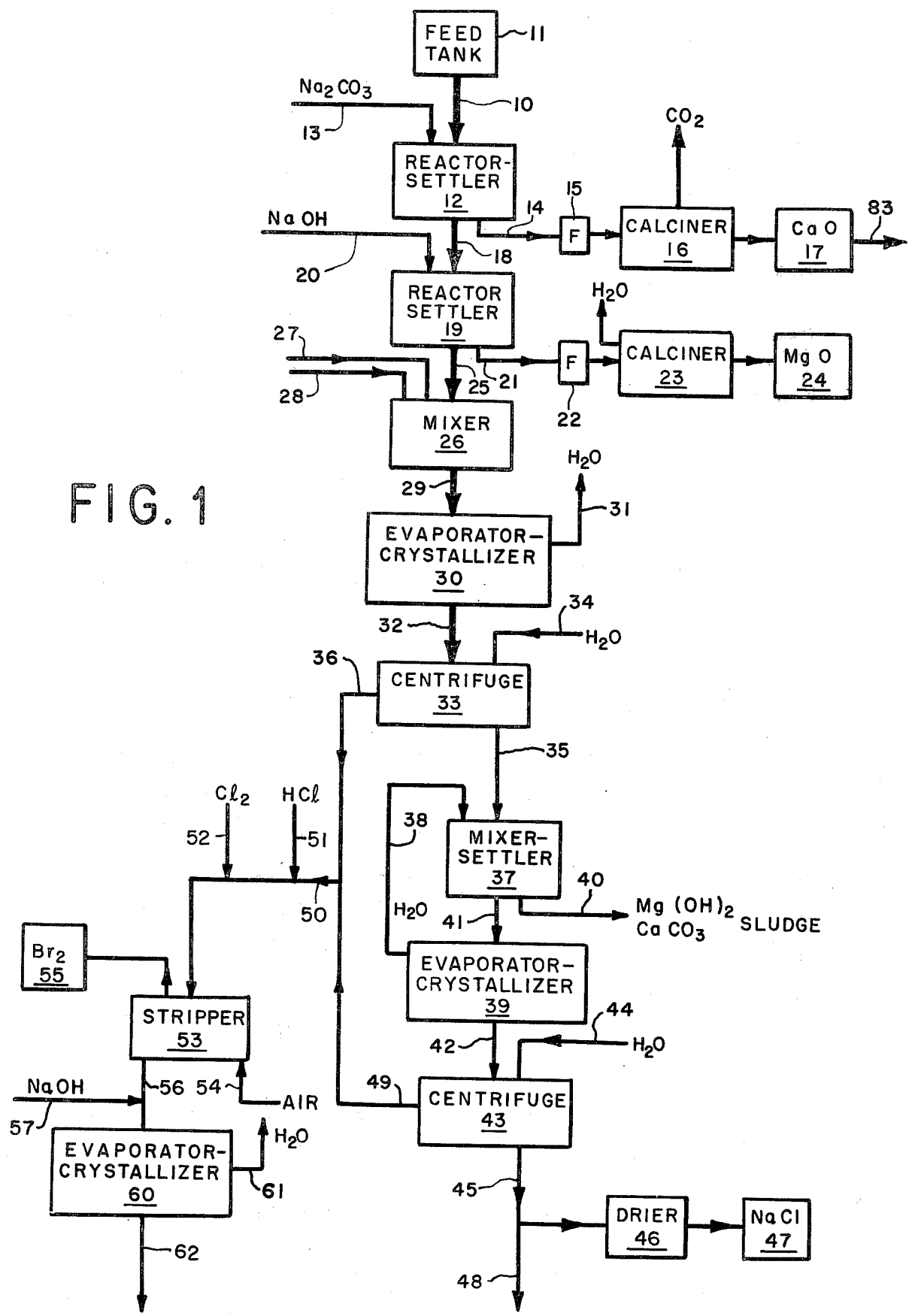
FIGS. 1 through 4 are a schematic flow diagram of the preferred embodiments of the invention described below.
Figure 2:
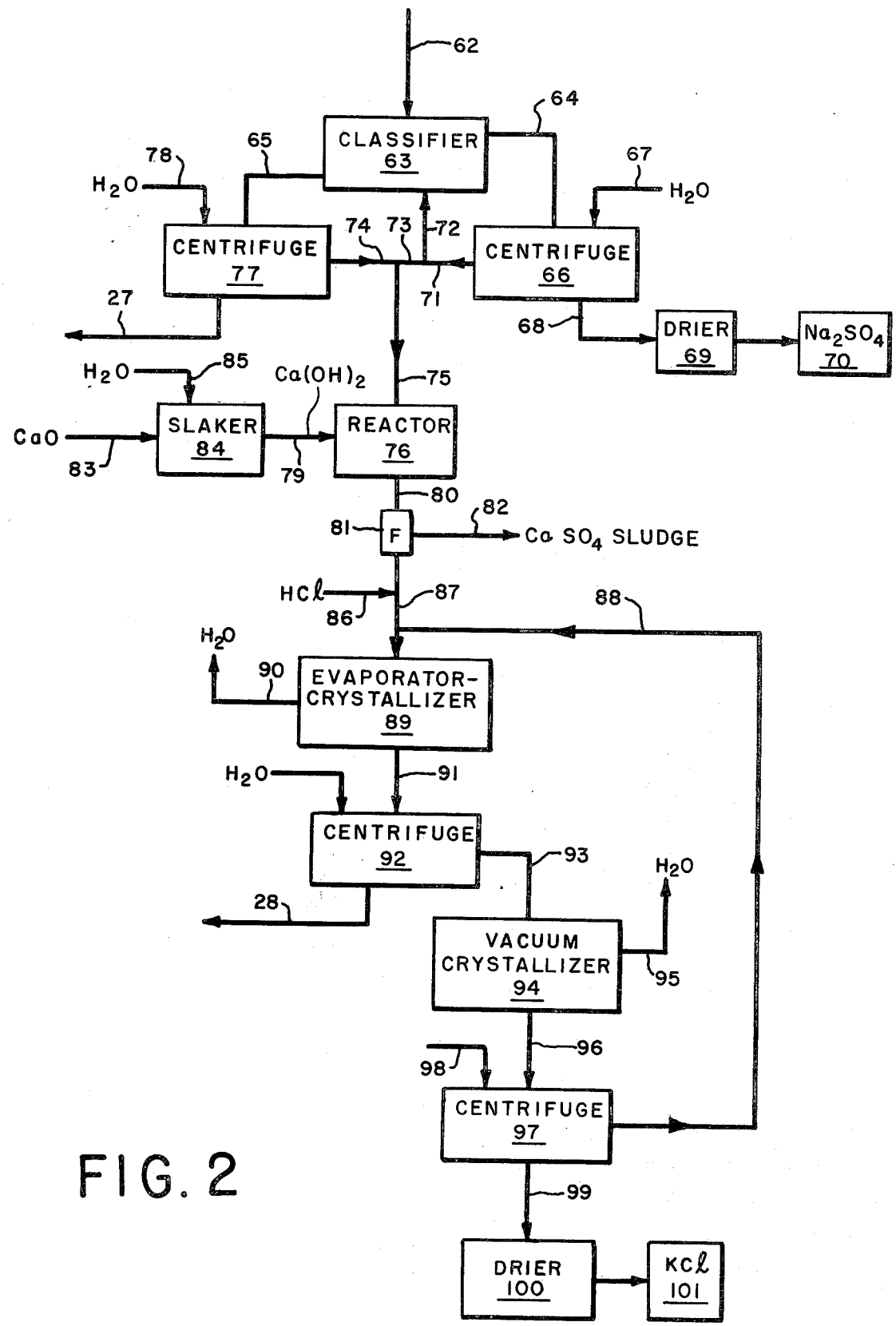
Figure 3:
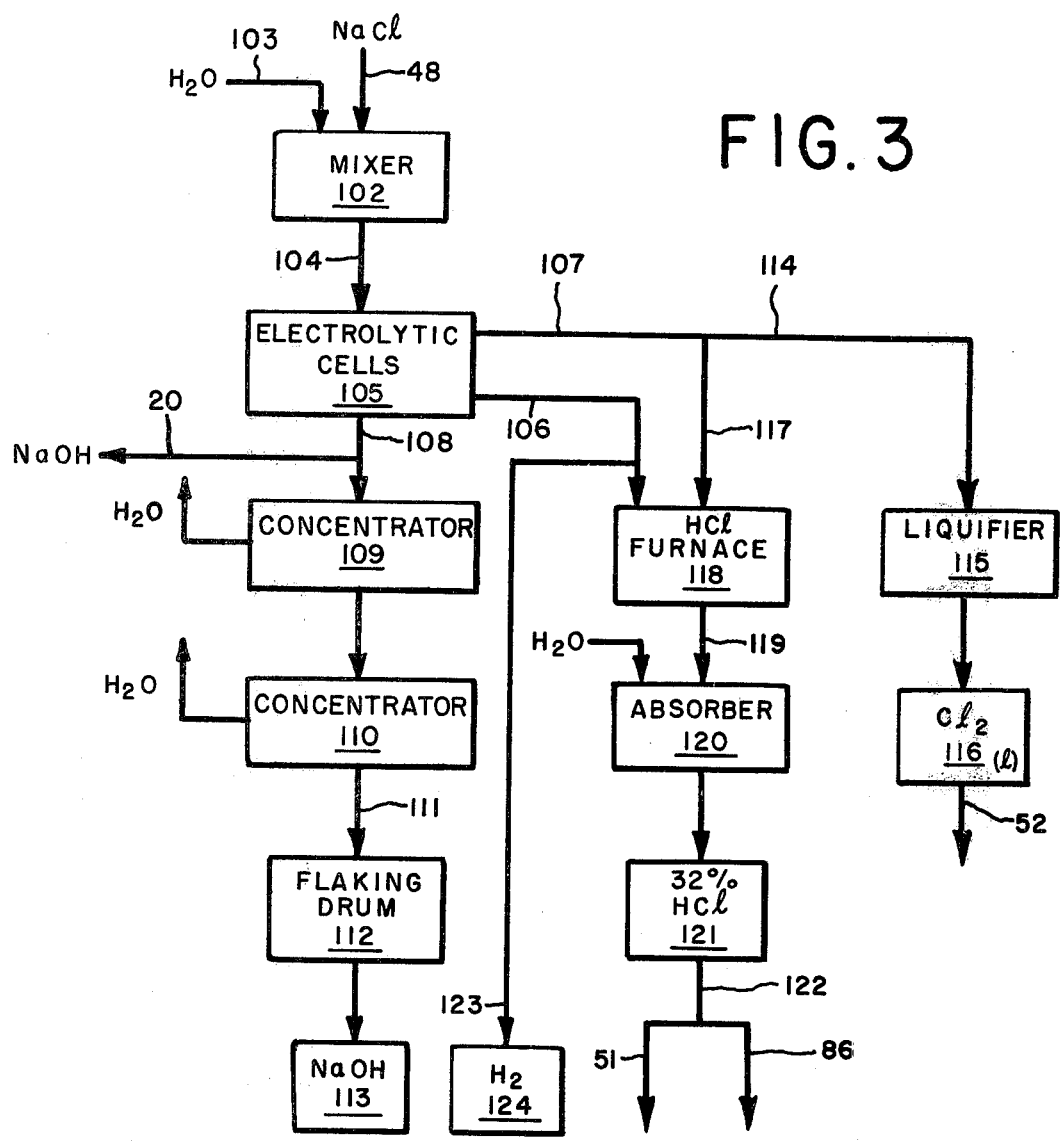

The invention may be employed to recover the commercially valuable, principal dissolved chemical constituents in saline waters, such as sea water, salt waters, salt water concentrates, brines, and the like, where the combined concentration of the principal chemical constituents normally ranges from about 3 to 8% or more by weight. These principal constituents include sodium, chlorine, magnesium, calcium, potassium, sulfate and bromine. (Bicarbonate also is a principal constituent in most saline waters, but it is not recovered by the process of the invention since bicarbonate is usually removed by pH control prior to the saline water's introduction into the process of the invention.) Typically, these principal constituents are recovered as sodium chloride, potassium chloride, sodium hydroxide (caustic soda), hydrochloric acid, sodium sulfate (salt cake), magnesium oxide (magnesia), calcium oxide (lime), chlorine, bromine, and hydrogen, although not all of these products need be recovered. Substantial quantities of potable water also are recovered.

The invention is most advantageously employed to recover the chemicals contained in the brine or blow down solutions produced as a by-product in commercial saline water desalination plants. Such plants have become an important source of potable water in many arid countries, and today some desalination plants produce as much as 50 million gallons per day of fresh water. While many different methods are employed to desalinate sea water, all produce substantial quantities of salt containing brine wastes.

The preferred embodiment of the invention illustrated in the drawings and described below is especially adapted for use with desalination plant by-product brine solutions, such as those from multi-stage flash evaporation systems. The salt concentration in such a solution is typically about 5-7% or more. While the distribution of salts may vary somewhat, a brine solution containing about 6% salts typically would include about 4.5% dissociated sodium chloride, 0.65% magnesium chloride, 0.4% magnesium sulfate, 0.25% calcium sulfate, 0.13% potassium chloride and about 0.01% sodium bromide. Bicarbonates are normally not present in such brine solutions because the bicarbonate has been removed prior to desalination to minimize alkaline scale fouling in the desalination equipment.

In the preferred embodiment outlined in the drawings, the saline water feed solution 10, a desalination plant by-product brine solution containing about 6% dissolved salts, is withdrawn from feed storage trank 10 and charged to mixer-settler reactor 12. A sodium carbonate (soda ash) aqueous solution 13 is introduced into reactor 12. As will be explained below, this carbonate solution may be produced at another step in the process and recycled to reactor 12. The sodium carbonate solution 13 reacts with the calcium sulfate in the feed to produce sodium sulfate and insoluble calcium carbonate. Essentially all of the calcium carbonate, about 99% or more, preferably about 99.8% or more, settles out of the solution and is removed from reactor 12 at 14. The calcium carbonate 14 is then filtered in filter 15 and calcined in calciner 16 to convert the calcium carbonate to calcium oxide (quick lime), one of the commercially valuable products produced by the invention. The lime may be stored in storage bin 17. A portion of the lime may be used at a later point in the process, as will be discussed below.

A calcium depleted solution 18 is removed from reactor 12 and is introduced to mixer-settler reactor 19. Caustic soda (sodium hydroxide) 20 also is introduced to reactor 19. As with the sodium carbonate used in reactor 12, the sodium hydroxide used in reactor 19 may be produced at another point in the process. In reactor 19, caustic soda 20 reacts with the magnesium sulfate and magnesium chloride in the feed to produce sodium chloride, more sodium sulfate and insoluble magnesium hydroxide. Essentially all of the magnesium hydroxide, about 99% or more, preferably about 99.8% or more, settles out of the solution produced in reactor 19, and it then is removed at 21. The magnesium hydroxide 21 is filtered in filter 22 and calcined in calciner 23 to convert the magnesium hydroxide to magnesium oxide (magnesia). The magnesia, which is one of the commercially valuable products produced by the invention, may be stored in storage bin 24.

The removal of essentially all of the magnesium and calcium at the beginning of the process removes hardness from the feed. This minimizes scaling and fouling problems in the evaporation steps and eliminates the need for expensive, special alloy equipment, such as that made with titanium, Monel, etc. The conversion of magnesium chloride and the magnesium and calcium sulfates to sodium chloride and sodium sulfates also is highly advantageous since these sodium salts may be recovered at later stages of the process.

A magnesium and calcium depleted solution 25 is removed from reactor 19. Solution 25 is a nonsaturated solution which contains about 6% dissolved salt, if the preferred feed is employed. Solution 25 includes sodium chloride, sodium sulfate, potassium chloride, sodium bromide, and very minor concentrations of entrained calcium carbonate and magnesium hydroxide. Solution 25 is introduced into stirred mixer 26. Mixer 26 is employed to increase the salt concentration to about 7–8% or more immediately prior to the principal evaporation-crystallization steps in the process. This is accomplished by combining solution 25 with salt recycled from other points in the process. These recycled salt sources, identified by reference numerals 27, 28, are preferably crystallized salt cakes having a high concentration of sodium chloride and low concentrations of various other salts. The sources of this recycled salt will be described below. This recycle operation is employed to help reduce the throughput volume and utility cost per unit of product, to reduce equipment size and to help improve the yield and purity of the sodium chloride salt crystals produced in the immediately following processing steps.

The fortified evaporator feed 29 is fed to evaporator-crystallizer 30. Evaporator-crystallizer 30 concentrates the salts by a factor of from about 6:1 to 10:1, preferably from about 7:1 to 9:1, by evaporating and removing substantial quantities of water from the feed solution. This water, which is removed at 31, is condensed to form a large part of the potable water produced by the process. Evaporator-crystallizer 30 also crystallizes a substantial percentage of the sodium chloride contained in the feed. Both the crystallized and the uncrystallized salts are removed from evaporator-crystallizer 30 as a slurry 32 which contains about 25% by weight of crystallized salt. Approximately 95% of the salt crystals in slurry 32 are sodium chloride; the balance is primarily sodium sulfate and minor concentrations of previously unremoved magnesium hydroxide and calcium carbonate. Slurry 32 is charged to centrifuge 33 along with a minor amount of wash water 34, and slurry 32 is separated into a solid crystal containing cake 35 and a mother liquor 36, primarily composed of water and dissolved salts.

Crystal cake 35 then is charged to mixer-settler 37 and is dissolved in water to form a saturated salt solution. Preferably, the water used to form this saturated solution is obtained from the vapor condensate 38 from the second stage evaporator-crystallizer 39. It also may be obtained from other water vapor condensate streams so that the use of outside make-up water may be eliminated. Virtually all of the magnesium hydroxide and calcium carbonate present in cake 35 fails to dissolve in mixer-settler 37 and may be removed from the system at 40 as a discardable sludge.

The saturated brine solution formed in mixer-settler 37 is transferred via 41 to a second stage evaporator-crystallizer 39 in which the water added in mixer-settler 37 is removed (and recycled 38 to mixer-settler 37) and the sodium chloride is recrystallized. Both the crystallized and the uncrystallized salts are removed in a slurry stream 42 which then is centrifuged in centrifuge 43 with the aid of wash water 44. Slurry 42 contains about 25% by weight salt crystals. These crystals are virtually pure (about 99.99%) sodium chloride so that the cake 45 from centrifuge 43 may be dried in drier 46 to a commercial quality sodium chloride product. This product may be stored in storage bin 47. Preferably, a portion 48 of the pure sodium chloride cake product 45 is not dried to finished sodium chloride, but is redissolved and processed further to make additional products and some of the chemicals used in the process. These further sodium chloride cake processing steps are described below.

The mother liquor stream 49 from centrifuge 43 is combined with mother liquor stream 36 from centrifuge 33. This combined stream 50 contains potassium chloride, sodium sulfate, sodium bromide and the sodium chloride which remained in solution through the evaporative crystallization and centrifugation steps. Stream 50 is acidified, preferably with hydrochloric acid 51, and chlorine 52 is added to react with the sodium bromide to form bromine and more sodium chloride. This may be carried out in line and both the chlorine and hydrochloric acid may be supplied from other steps of the process. The bromine then is stripped from the system in stripper 53 which uses air 54 to entrain the molecular bromine. The bromine 55 recovered from stripper 53 is another one of the commercially valuable products produced by the invention.

The salt containing stripper output stream 56, which contains sodium chloride, sodium sulfate and potassium chloride, is neutralized at 57, preferably with sodium hydroxide, and then is charged to evaporator-crystallizer 60. Evaporator-crystallizer 60 further concentrates the remaining salts by the evaporation of water 61, which may be recovered as potable water, and crystallizes both sodium chloride and sodium sulfate crystals. The operating conditions in evaporator-crystallizer 60 are selected and maintained so that the evaporation is not carried to the point at which potassium chloride crystals would be formed. Preferably, the evaporation in evaporator-crystallizer 60 is controlled by monitoring slurry output stream 62 to maintain the potassium chloride concentration in stream 62 between about 6 to 8%, preferably about 7%. The slurry output 62 from evaporator-crystallizer 60 then is fed to an elutriation classifier column 63 which separates slurry 62 into a sodium sulfate crystal rich slurry 64 and a sodium chloride crystal rich slurry 65. This elutriation separation is possible because the sodium sulfate crystals are much smaller crystals than are the sodium chloride crystals. Of course, the sodium sulfate rich slurry 64 contains a minor concentration of sodium chloride crystals and the sodium chloride rich slurry 65 contains a minor concentration of sodium sulfate crystals.

The sodium sulfate crystal rich slurry 64 is centrifuged in centrifuge 66 with wash water 67. The cake 68 from centrifuge 66 is dried in drier 69 to form commercially salable anhydrous sodium sulfate (salt cake) which may be stored in bin 70. The mother liquor stream 71 from centrifuge 66 is split so that one portion 72 of stream 71 is recycled to classifier 63 to provide additional solution for the elutriation classification. The other portion 73 of mother liquor stream 71 is combined with a second mother liquor stream 74 to form a second combined mother liquor stream 75 which is the feed to mixer reactor 76. The second mother liquor stream 74 is obtained from centrifuge 77 in which the sodium chloride rich slurry 65 is separated into mother liquor stream 74 and cake 27 with the aid of wash water 78. Cake 27, which comprises sodium chloride crystals with a very minor concentration of sodium sulfate crystals, is one of the principal recycle salt sources for mixer 26, which precedes first evaporator-crystallizer 30.

Combined mother liquor stream 75 contains significant concentrations of sodium chloride, sodium sulfate and potassium chloride, with the sodium chloride concentration being much greater than the concentrations of the other two salts. If the preferred by-product brine solutions are used as the process feed, stream 75 typically will contain about 21% sodium chloride and 7% of both sodium sulfate and potassium chloride.

Mixer reactor 76 is used to remove the residual sulfate (sodium sulfate) from the system prior to the potassium chloride recovery steps. This removal is achieved by adding calcium hydroxide 79 to reactor 76 to convert the sodium sulfate to calcium sulfate and sodium hydroxide. The calcium hydroxide 79 used in reactor 76 may be obtained from the process itself by the conversion of a portion of the calcium oxide produced at the beginning of the process. Thus, calcium oxide may be withdrawn from storage tank 17 at 83 and charged to slaker 84 together with water 85 to convert the calcium oxide to calcium hydroxide. The calcium hydroxide product 79 then is used in reactor 76. The reaction product stream 80 from reactor 76 flows through filter 81 to remove an unusable calcium sulfate containing sludge 82 before further processing. At this point, stream 80 principally comprises sodium chloride, potassium chloride and sodium hydroxide in an aqueous solution.

The filtered reaction product stream 80 from reactor 76 is treated with hydrochloric acid 86 to convert the sodium hydroxide in the stream to sodium chloride and water. This produces a treated aqueous solution 87 which contains significant concentrations of only sodium chloride and potassium chloride. Treated solution 87 is fed to evaporator-crystallizer 89. Recycle stream 88 also may be fed to evaporator-crystallizer 89.

Evaporator-crystallizer 89 removes substantial quantities of the remaining water 90 and crystallizes a substantial portion of the sodium chloride in the crystallizer feed. The sodium chloride crystal containing slurry 91 from evaporator-crystallizer 89 then is charged to centrifuge 92 along with a minor amount of wash water 34, and slurry 91 is separated into a crystal containing cake 28 and a mother liquor stream 93. The mother liquor stream 93 comprises potassium chloride, a small concentration of dissolved sodium chloride, and the remaining water. Cake 28, which comprises sodium chloride crystals together with a minor concentration of potassium chloride, is the second principal recycle salt source for mixer 26, which precedes first evaporator-crystallizer 30.

Mother liquor stream 93 is charged to a vacuum crystallizer 94 which is operated at a relatively low temperature, on the order of about 100° F., in comparison to the operating temperature of the evaporator-crystallizers. In vacuum crystallizer 94, water 95 is removed under vacuum and potassium chloride crystals are formed to produce a potassium chloride crystal rich slurry 96. Adiabatic conditions are employed in vacuum crystallizer 94 to help prevent the crystallization of the sodium chloride contained in the feed. Slurry 96 is charged to centrifuge 97 along with wash water 98, and the slurry is separated into a potassium chloride crystal cake 99 and mother liquor stream 88. Mother liquor stream 88, which contains dissolved sodium chloride and potassium chloride, preferably is recycled to evaporator-crystallizer 89. The potassium chloride cake 99 is fed to drier 100 to remove remaining water. The dried potassium chloride may be transferred to storage bin 101 to await shipment.

In a preferred embodiment of the invention, a portion 48 of the sodium chloride produced by the process is treated to produce some of the chemicals consumed by the process, together with a variety of valuable commercial products. In accordance with this preferred embodiment, sodium chloride 48 is fed to a mixer 102 where it is redissolved in water 103. The dissolved sodium chloride 104 then is fed to an electrolytic cell system 105 which electrolyzes the solution to hydrogen and chlorine gases, 106 and 107 respectively, and to sodium hydroxide. The sodium hydroxide remains in solution and is removed from electrolytic cell system 105 as a 30–50% sodium hydroxide solution 108. A portion 20 of this solution 108 then may be used as a part of the sodium hydroxide feed to reactor-settler 19, in which a sodium hydroxide solution is added to convert magnesium salts to magnesium hydroxide. The remainder of solution 108 is fed to concentrators 109 and 110 which are connected in series. These concentrators are used to evaporate the water in which the sodium hydroxide is dissolved. The concentrated sodium hydroxide 111 obtained from the second concentrator 110 is transferred to a flaking drum 112 in which the sodium hydroxide is flaked to form the final flaked caustic product which may be stored in bin 113. This flaked sodium hydroxide is another of the many commercially valuable products which may be produced by the process.

The chlorine gas 107 produced in electrolytic cells 105 is advantageously used to produce two additional commercially valuable products, liquid chlorine and hydrochloric acid, both of which also may be used in the process itself. Thus, one portion 114 of the chlorine gas 107 is transferred to liquifier 115 in which the gaseous chlorine is liquified. This liquified chlorine is stored in storage tank 116. A portion of this liquid chlorine may be added to mother liquor stream 50 at 52 to convert sodium bromide to molecular bromine and sodium chloride. The other portion 117 of the chlorine gas is charged to a hydrochloric acid furnace 118 along with a portion of the hydrogen gas 106 produced in electrolytic cells 105. In furnace 118, the hydrogen and chlorine gases are converted to hydrogen chloride 119. Water is added to the hydrogen chloride 119 in absorber 120 to prepare a hydrochloric acid solution, preferably a concentrated solution containing about 32% hydrogen chloride. This solution may be stored in storage tank 121. While the concentrated hydrochloric acid solution is another of the salable products produced by the process, it also is consumed at two different points in the preferred embodiment disclosed herein. Thus, a portion 122 of the hydrochloric acid may be removed from tank 121 and may be added to mother liquor stream 50 at 51 and to the sulfate depleted stream 81 removed from reactor 76 at 86. The hydrogen gas 123 which is not needed for the production of hydrochlorine acid may be collected in storage tank 124. This hydrogen may be sold.

Figure 4:
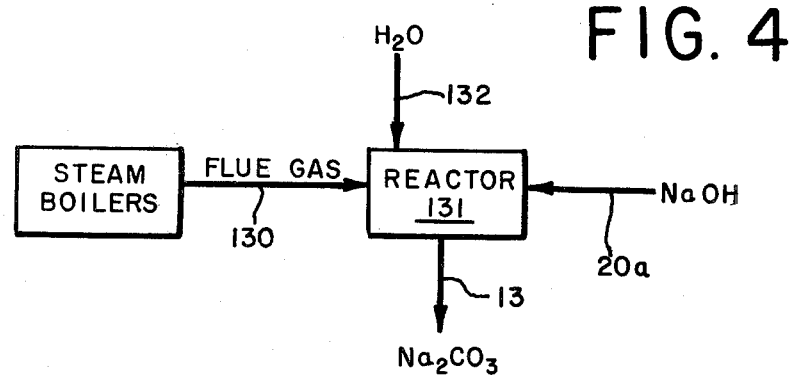

In the illustrated preferred embodiment, at least a portion of the sodium carbonate 13 used in reactor 12 may be produced from the flue gas given off by the boilers employed to generate the stream used in the evaporation steps of the process. Thus flue gas, 130 in FIG. 4, is charged to a reactor 131 along with water 132 and sodium hydroxide 20a to convert the ash in the flue gas to sodium carbonate 13 which then may be charged to reactor 12. The sodium hydroxide stream 20a used in reactor 131 preferably is obtained from the sodium hydroxide solution 108 produced by the electrolytic cells 105.

The temperatures, pressures, reaction conditions and other processing conditions employed in the process generally are not critical and will be known to those skilled in the art, given the processing sequence and other details described above, in light of the feed composition, utility costs and other factors related to any specific application of the process.

Advantageously, the slurry 32 removed from first evaporator-crystallizer 30 is at a temperature between about 200° F. and 219° F., the latter temperature being the upper limit at which the slurry may be removed. Preferably, the temperature of slurry 32 is about 212° F. The temperature of recrystallization in second evaporator-crystallizer 39 advantageously is between about 115° F. and 135° F., since this temperature should be as low as reasonably possible. Preferably this temperature is about 125°. The temperatures employed in the remaining evaporator-crystallizers advantageously is about 200° F. to 219° F., with a temperature about 212° F. being preferred. As noted above, the temperature of vacuum crystallizer 94 preferably is on the order of about 100° F. In addition, the temperature of the saline water feed preferably is on the order of about 105° F., although this temperature is by no means critical.

Similarly, the specific types of equipment that are employed to carry out the process generally are not critical and will be known to those skilled in the art, given the details described above and the volume of saline water that is to be processed, the cost of utilities, equipment availability and the various other factors known by those in the art. As noted above, special alloy equipment is not needed for the major steps in the process. Thus, commonly available chemical processing equipment generally may be employed. Preferably, all of the evaporative-crystallization steps are combined into an integrated, multiple effect evaporator system. This has the effect of substantially reducing the amount of steam needed for the water evaporation steps.

The principal advantage of the preferred embodiment of the invention described herein is the ability to economically recover commercially salable sodium hydroxide, hydrochloric acid, chlorine, sodium sulfate, sodium chloride, potassium chloride, bromine, and other compounds, such as magnesium oxide and calcium oxide, from desalination plant brine solutions, at the same time virtually all of the water in the brine solution is recovered as potable water.

With this process it is possible to recover much more sodium chloride and sodium chloride derived products per unit of feed than is possible with conventional processes. Moreover, the preferred embodiments of the process permit the recovery of all of the other chemicals noted above, large quantities of potable water and only a small amount of unusable wastes. As a result, the process produces a greater value of salable chemicals per day than is possible with conventional processes, even though the capital investment and operating costs are not significantly greater than for conventional sodium chloride recovery processes.

As an example, the following approximate amounts of products may be produced in a 2230 metric ton per day plant operated in accordance with the preferred embodiments described above, using a 6% salt desalination plant brine feed having the approximate composition set forth at the beginning of the description of the preferred embodiments: 100 tons per day (t/d) of 50% sodium hydroxide; 64 t/d of 32% hydrochloric acid; 43.5 t/d of chlorine; 13 t/d of sodium sulfate; 15 t/d of sodium chloride; 9 t/d of magnesium oxide; 3 t/d of potassium chloride; 2 t/d of calcium oxide; 1 t/d of hydrogen; 0.15 t/d of bromine; and 1970 t/d of potable water.

The embodiments described herein are intended to describe certain preferred embodiments of the saline water chemical recovery process of the invention. However, one skilled in the art would certainly be expected to be able to make many modifications and variations of these preferred embodiments without departing from spirit or the scope of the invention as it is defined in the following claims.

I claim:

1. A process for the recovery of chemicals from saline water, comprising:

adding sodium carbonate to the saline water to convert calcium sulfate to calcium carbonate and sodium sulfate, separating the calcium carbonate to form a first solution, and calcining the separated calcium carbonate to calcium oxide;

adding sodium hydroxide to the first solution to convert magnesium chloride and magnesium sulfate to magnesium hydroxide, sodium sulfate and sodium chloride, separating the magnesium hydroxide to form a second solution, and calcining the separated magnesium hydroxide to magnesium oxide;

mixing the second solution with recycled sodium chloride to form a sodium chloride fortified third solution;

crystallizing and then separating sodium chloride crystals from the third solution to form a fourth solution;

dissolving the separated sodium chloride crystals in water to form a fifth solution;

recrystallizing and then separating sodium chloride crystals from the fifth solution to form a sixth solution;

combining the fourth and sixth solutions to form a seventh solution;

adding hydrochloric acid and chlorine to the seventh solution to convert sodium bromide to sodium chloride and bromine to form an eighth solution, stripping the bromine from the eighth solution, and then neutralizing the bromine stripped solution to form a ninth solution;

crystallizing sodium chloride and sodium sulfate crystals from the ninth solution to form a tenth solution;

separating the sodium chloride and the sodium sulfate crystals from the tenth solution to form a sodium chloride crystal rich slurry and a sodium sulfate crystal rich slurry;

separating the sodium sulfate crystals from the sodium sulfate crystal rich slurry to form an eleventh solution;

separating the sodium chloride crystals from the sodium chloride crystal rich slurry to form a twelfth solution;

mixing the sodium chloride crystals separated from the sodium chloride crystal rich slurry with the second solution to fortify the second solution;

combining the eleventh and twelfth solutions to form a thirteenth solution;

adding calcium hydroxide to the thirteenth solution to convert residual sodium sulfate to sodium hydroxide and calcium sulfate and then separating the calcium sulfate to form a fourteenth solution;

adding hydrochloric acid to the fourteenth solution to convert sodium hydroxide to sodium chloride and to form a fifteenth solution;

crystallizing and then separating sodium chloride crystals from the fifteenth solution to form a sixteenth solution;

mixing the sodium chloride crystals separated from the fifteenth solution with the second solution to fortify the second solution;

crystallizing and then separating potassium chloride crystals from the sixteenth solution to form a seventeenth solution; and mixing the seventeenth solution with the fifteenth solution to fortify the fifteenth solution for crystallization.

2. The process of claim 1, further comprising: dissolving a portion of the sodium chloride crystals separated from the fifth solution in water to form an eighteenth solution; electrolytically treating the eighteenth solution to convert the solution to hydrogen and chlorine gases and to a nineteenth solution containing sodium hydroxide; liquifying a portion of the chlorine; and converting a portion of the hydrogen and chlorine gases to hydrochloric acid.

3. The process of claim 2, wherein a portion of the nineteenth solution is added to the saline water feed.

4. The process of claim 3, wherein the portion of the nineteenth solution not added to the saline water feed is concentrated to commercially pure solid sodium hydroxide.

5. The process of claim 2, further comprising reacting flue gas with water and sodium hydroxide to produce sodium carbonate, then adding the feed and the sodium carbonate to the first solution.

6. The process of claim 1, wherein the third, fifth, ninth and fifteenth solutions are crystallized in evaporative crystallizers.

7. The process of claim 6, wherein the water evaporated from the evaporative crystallizer in which the fifth solution is crystallized supplies at least a part of the water used to form the fifth solution.

8. The process of claim 1, further comprising the drying of the sodium sulfate crystals separated from sodium sulfate crystal rich slurry and the drying of the potassium chloride crystals separated from the sixteenth solution.

9. The process of claim 1, wherein the saline water is a brine solution produced by the desalination of sea water.

10. The process of claim 1, wherein a portion of the calcium oxide is slaked with water to form calcium hydroxide and the calcium hydroxide is added to the thirteenth solution.

11. The process of claim 1, wherein elutriation classification is used to form the sodium chloride crystal rich slurry and the sodium sulfate crystal rich slurry from the tenth solution, and the third, fifth, ninth and fifteenth solutions are crystallized in evaporative crystallizers.

12. A process for the recovery of chemicals from saline water, comprising:

converting the sulfates in the saline water to sodium sulfate, and separating essentially all of the magnesium and calcium from the saline water to form a magnesium and calcium depleted first solution;

mixing the first solution with recycled sodium chloride to form a sodium chloride fortified second solution;

crystallizing and then separating sodium chloride crystals from the second solution to form a third solution;

separating bromine from the third solution to form a fourth solution;

crystallizing sodium chloride and sodium sulfate crystals from the fourth solution to form a fifth solution;

separating the sodium chloride and the sodium sulfate crystals from each other and from the fifth solution to form a sixth solution;

mixing the sodium chloride crystals separated from the fifth solution with the first solution;

separating residual sulfates from the sixth solution to form a seventh solution;

crystallizing and then separating sodium chloride crystals from the seventh solution to form an eighth solution;

mixing the sodium chloride crystals separated from the seventh solution with the first solution; and crystallizing and then separating potassium chloride crystals from the eighth solution.

13. The process of claim 12, wherein the separation of the magnesium from the saline water comprises adding sodium hydroxide to the saline water to convert the magnesium to magnesium hydroxide and separating the magnesium hydroxide from the solution.

14. The process of claim 13, further comprising the calcining of the magnesium hydroxide to magnesium oxide.

15. The process of claim 12, wherein the separation of the calcium from the saline water comprises adding sodium carbonate to convert the calcium to calcium carbonate and separating the calcium carbonate from the solution.

16. The process of claim 15, further comprising the calcining of the calcium carbonate to calcium oxide.

17. The process of claim 12, wherein the crystallization and separation of sodium chloride crystals from the second solution comprises crystallizing sodium chloride crystals from the second solution; separating the crystals from the second solution to form a first mother liquor solution; dissolving the separated crystals in water to form a redissolved solution; recrystallizing sodium chloride crystals from the redissolved solution; separating the sodium chloride crystals from the redissolved solution to form a second mother liquor solution; and combining the first and second mother liquor solutions to form the third solution.

18. The process of claim 17, wherein the crystals separated from the second solution are dissolved in water to form a salt saturated redissolved solution.

19. The process of claim 12, further comprising mixing the solution from which the potassium chloride crystals have been separated with the seventh solution to fortify the feed to the subsequent sodium chloride crystallization.

20. The process of claim 12, wherein the saline water is a brine solution produced by the desalination of sea water.

21. The process of claim 12, wherein the sodium chloride and the sodium sulfate crystals in the fifth solution are separated from each other by elutriation classification.

22. The process of claim 12, further comprising dissolving at least a portion of the sodium chloride crystals separated from the second solution in water to form a ninth solution; electrolytically treating the ninth solution to convert the solution to hydrogen and chlorine gases and to a tenth solution containing sodium hydroxide; concentrating a portion of the tenth solution to form commercially pure solid sodium hydroxide; liquifying a portion of the chlorine gas; and converting a portion of the hydrogen and chlorine gases to hydrochloric acid.

23. A process for the recovery of chemicals from saline water, comprising:
  converting the sulfates in the saline water to sodium sulfate, and separating essentially all of the magnesium and calcium from the saline water to form a magnesium and calcium depleted first solution;
  mixing the first solution with recycled sodium chloride to form a sodium chloride fortified second solution;
  crystallizing and then separating sodium chloride crystals from the second solution to form a third solution;
  dissolving the separated sodium chloride crystals in water to form a fourth solution;
  recrystallizing and then separating sodium chloride crystals from the fourth solution to form a fifth solution;
  combining the third and fifth solutions to form a sixth solution;
  separating bromine from the sixth solution to form a seventh solution;
  crystallizing sodium chloride and sodium sulfate crystals from the seventh solution to form an eighth solution;
  separating the sodium chloride and the sodium sulfate crystals from each other and from the eighth solution to form a ninth solution;
  mixing the sodium chloride crystals separated from the eighth solution with the first solution;
  separating residual sulfates from the ninth solution to form a tenth solution;
  crystallizing and then separating sodium chloride crystals from the tenth solution to form an eleventh solution;
  mixing the sodium chloride crystals separated from the tenth solution with the first solution;
  crystallizing and then separating potassium chloride crystals from the eleventh solution to form a twelfth solution; and
  mixing the twelfth solution with the tenth solution to fortify the feed to the subsequent sodium chloride crystallization.

24. The process of claim 23, wherein the separation of the magnesium and calcium from the saline water comprises: adding sodium carbonate to the saline water to convert the calcium sulfate to calcium carbonate and sodium sulfate and separating the calcium carbonate to form a calcium depleted solution; and adding sodium hydroxide to the calcium depleted solution to convert the magnesium compounds to magnesium hydroxide, sodium sulfate and sodium chloride and separating the magnesium hydroxide to form the magnesium and calcium depleted first solution.

25. The process of claim 24, further comprising the calcining of the separated magnesium hydroxide to magnesium oxide and the calcining of the separated calcium carbonate to calcium oxide.

26. The process of claim 23, wherein the fourth solution is a saturated salt solution.

27. The process of claim 23, wherein the saline water is a brine solution produced by the desalination of sea water.

28. The process of claim 23, wherein the sodium chloride and the sodium sulfate crystals in the eighth solution are separated from each other by elutriation classification.

29. The process of claim 28, further comprising:
  separating from solution the sodium chloride crystals separated from the sodium sulfate crystals, prior to mixing said sodium chloride crystals with the first solution;
  combining at least part of the mother liquors from the sodium sulfate-sodium chloride crystal separation steps to form a fifth solution;
  crystallizing and then separating sodium chloride crystals from the fifth solution to form a sixth solution;
  mixing the sodium chloride crystals separated from the fifth solution with the first solution; and
  crystallizing and then separating potassium chloride crystals from the sixth solution.

30. A process for the recovery of chemicals from saline water, comprising:
  converting the sulfates in the saline water to sodium sulfate, and separating essentially all of the magnesium and calcium from the saline water to form a magnesium and calcium depleted first solution;
  mixing the first solution with recycled sodium chloride to form a sodium chloride fortified second solution;
  crystallizing and then separating sodium chloride crystals from the second solution to form a third solution;
  crystallizing sodium chloride and sodium sulfate crystals from the third solution to form a fourth solution;
  separating the sodium chloride and the sodium sulfate crystals in the fourth solution from each other;
  separating the sodium sulfate crystals from solution; and
  mixing the sodium chloride crystals separated from the fourth solution with the first solution.

31. The process of claim 29, further comprising: separating residual sulfates from the fifth solution prior to the crystallization of the fifth solution; and mixing the solution from which the potassium chloride crystals have been separated with the fifth solution to fortify the sodium chloride content of said solution prior to the crystallization of said solution.

32. The process of claim 29, wherein the crystallization and separation of sodium chloride crystals from the second solution comprises: crystallizing sodium chloride crystals from the second solution; separating the crystals from the second solution to form a first mother liquor solution; dissolving the separated crystals in water to form a redissolved solution; recrystallizing sodium chloride crystals from the redissolved solution; separating the sodium chloride crystals from the redissolved solution to form a second mother liquor solution; and combining the first and second mother liquor solutions to form the third solution.

33. The process of claim 23, wherein:

magnesium and calcium compounds are removed from the fourth solution prior to the crystallization of said solution;

the sixth solution is acidified and chlorine is added prior to the separation of the bromine from the sixth solution;

the seventh solution is neutralized with a sodium compound prior to the crystallization of the seventh solution;

the sodium chloride and the sodium sulfate crystals in the eighth solution are separated from each other by elutriation classification; and the tenth solution is treated to convert the sodium hydroxide in the solution to sodium chloride.

* * * * *

UNITED STATES PATENT AND TRADEMARK OFFICE
CERTIFICATE OF CORRECTION

PATENT NO. : 4,180,547
DATED : December 25, 1979
INVENTOR(S) : Anthony N. Chirico It is certified that error appears in the above—identified patent and that said Letters Patent are hereby corrected as shown below:

Column 4, lines 38-39, "carb on-ate" should read --carbonate--.

Claim 17, line 3, after "comprises," insert --:--.

Claim 29, line 1, "28" should read --30--.

Signed and Sealed this

Tenth Day of June 1980

[SEAL]

*Attest:*

SIDNEY A. DIAMOND

*Attesting Officer*   *Commissioner of Patents and Trademarks*